(12) United States Patent
Greenbaum et al.

(10) Patent No.: US 10,009,254 B2
(45) Date of Patent: Jun. 26, 2018

(54) CALCULATION OF A LOWEST COST PATH

(71) Applicant: NetScout Systems, Inc., Westford, MA (US)

(72) Inventors: David A. Greenbaum, Cherry Hill, NJ (US); Steven M. Rosenberry, Reading, PA (US); Peter D. Toich, Evesham, NJ (US); John C. Curtis, Spring Lake Heights, NJ (US)

(73) Assignee: NetScout Systems, Inc., Westford, MA (US)

( * ) Notice: Subject to any disclaimer, the term of this patent is extended or adjusted under 35 U.S.C. 154(b) by 189 days.

(21) Appl. No.: 15/159,596

(22) Filed: May 19, 2016

(65) Prior Publication Data

US 2017/0331722 A1 Nov. 16, 2017

Related U.S. Application Data

(60) Provisional application No. 62/334,293, filed on May 10, 2016.

(51) Int. Cl.
*G06F 15/16* (2006.01)
*H04L 12/721* (2013.01)
*H04L 12/729* (2013.01)
*H04L 12/733* (2013.01)

(52) U.S. Cl.
CPC ............ *H04L 45/124* (2013.01); *H04L 45/12* (2013.01); *H04L 45/122* (2013.01); *H04L 45/125* (2013.01); *H04L 45/38* (2013.01)

(58) Field of Classification Search
CPC ...................................................... H04L 45/12
See application file for complete search history.

(56) References Cited

U.S. PATENT DOCUMENTS

| | | | | |
|---|---|---|---|---|
| 6,606,303 | B1* | 8/2003 | Hassel | H04L 45/04 370/238 |
| 8,644,149 | B2* | 2/2014 | Yedavalli | H04L 45/38 370/231 |
| 2005/0066052 | A1* | 3/2005 | Gupta | H04L 45/02 709/238 |
| 2005/0073958 | A1* | 4/2005 | Atlas | H04L 45/00 370/238 |
| 2005/0083848 | A1* | 4/2005 | Shao | H04L 45/00 370/238 |
| 2005/0220077 | A1* | 10/2005 | Vereecke | H04L 12/4641 370/351 |

(Continued)

*Primary Examiner* — Hieu Hoang
(74) *Attorney, Agent, or Firm* — Locke Lord LLP; Scott D. Wofsy; Christopher J. Capelli

(57) ABSTRACT

A method in a flow controller for selecting optimal path is provided. A plurality of potential flow paths in the network for a particular pair of source and destination switch ports is determined in a flow controller. A plurality of cost factors associated with each of the plurality of potential flow paths is identified. Individual cost values are determined for each of the identified plurality of cost factors for each of the plurality of potential flow paths by multiplying the identified cost factors by a stratification factor. A single cost value for each of the plurality of potential flow paths is determined based on the determined individual cost values. One of the potential flow paths is selected in the flow controller for the particular pair of source and destination switch ports based upon the determined single cost value.

20 Claims, 5 Drawing Sheets

(56) References Cited

U.S. PATENT DOCUMENTS

| | | | |
|---|---|---|---|
| 2006/0250961 A1* | 11/2006 | Vasseur | H04L 45/04 370/235 |
| 2009/0187876 A1* | 7/2009 | Su | G03F 1/68 716/50 |
| 2010/0172350 A1* | 7/2010 | Spencer | H04L 45/02 370/390 |
| 2012/0051745 A1* | 3/2012 | Srinivasan | H04L 45/125 398/58 |
| 2015/0197010 A1* | 7/2015 | Ruuspakka | B25J 9/1664 700/245 |
| 2016/0234578 A1* | 8/2016 | Sareen | H04Q 11/0062 |

* cited by examiner

CALCULATION OF A LOWEST COST PATH

CROSS REFERENCE TO RELATED APPLICATIONS

This application claims the benefit of the filing date of U.S. Provisional Patent Application Ser. No. 62/334,293 titled "Calculation of a Lowest Cost Path" and filed May 10, 2016.

FIELD OF THE INVENTION

Embodiments of the present elate to computer networks, and particularly to calculation of a lowest cost path.

BACKGROUND OF THE INVENTION

A split architecture network is an alternate paradigm for network architecture. A split architecture network is composed of a number of nodes, such as routers or switches, like traditional network architecture. However, in this paradigm, the control plane functionality of the network resides at a single central controller that can be in a single node of the network as illustrated in FIG. 1. This is in contrast to traditional network architecture where the control plane functionality resides on every node in the network. In a split architecture network, the network nodes are stripped of their control plane functionality and provide basic data plane functionality as 'flow switches.' A 'domain,' as used herein, is an area of a split architecture network where the flow switches are under the control of a single controller.

An example of a split architecture network is an OpenFlow based split architecture network. In an OpenFlow split architecture network, a controller and the flow switches in the data plane communicate using the OpenFlow Protocol. The OpenFlow protocol provides message infrastructure for the controller to program the flow switches in the data plane with appropriate flows for packet forwarding and processing. The controller can also obtain complete network state information for the network by querying each of the network nodes. This single logical OpenFlow controller can be implemented as a set or cluster of controllers responsible for a single domain of switches.

Unlike conventional network control, in OpenFlow, in order to allow communications between two communication nodes, the controller needs to determine an optimal path and set (distribute) the flow table for (to) the switches existing on the path. Note that, in the same manner as in the conventional network control, the controller can calculate the shortest path based on a Dijkstra's algorithm (Single Source Shortest Path Algorithm). Typically, the main basis for selecting a path is path cost, which can be specified in terms of a number of hops between nodes, or by some other metric such as bandwidth of links connecting nodes, or both.

It is desired to have methods and procedures to perform improved automatic selection of the optimal path that take into consideration multiple factors related to connection cost and conservation of network resources in split architecture networks.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method in a flow controller for selecting optimal path is provided. A plurality of potential flow paths in the network for a particular pair of source and destination switch ports is determined in a flow controller. A plurality of cost factors associated with each of the plurality of potential flow paths is identified. Individual cost values are determined for each of the identified plurality of cost factors for each of the plurality of potential flow paths by multiplying the identified cost factors by a stratification factor. A single cost value for each of the plurality of potential flow paths is determined based on the determined individual cost values. One of the potential flow paths is selected in the flow controller for the particular pair of source and destination switch ports based upon the determined single cost value.

In another aspect, another method for automatically selecting an optimal one of a plurality of paths between two ports is provided. A plurality of potential paths from a source port to a destination port through a graph representing a network is identified in a flow controller. Each of the potential paths includes a plurality of vertices and a plurality of edges connecting the plurality of vertices. The plurality of vertices represents a plurality of network nodes and the plurality of edges represents a plurality of network links interconnecting the plurality of network nodes. Edge weights are assigned to edges of the plurality of potential paths based on predefined path optimization criteria. A cost value for each of the plurality of potential paths is determined based on the assigned edge weights. One of the potential flow paths from the source port to the destination port are selected by the flow controller based upon the determined cost value.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
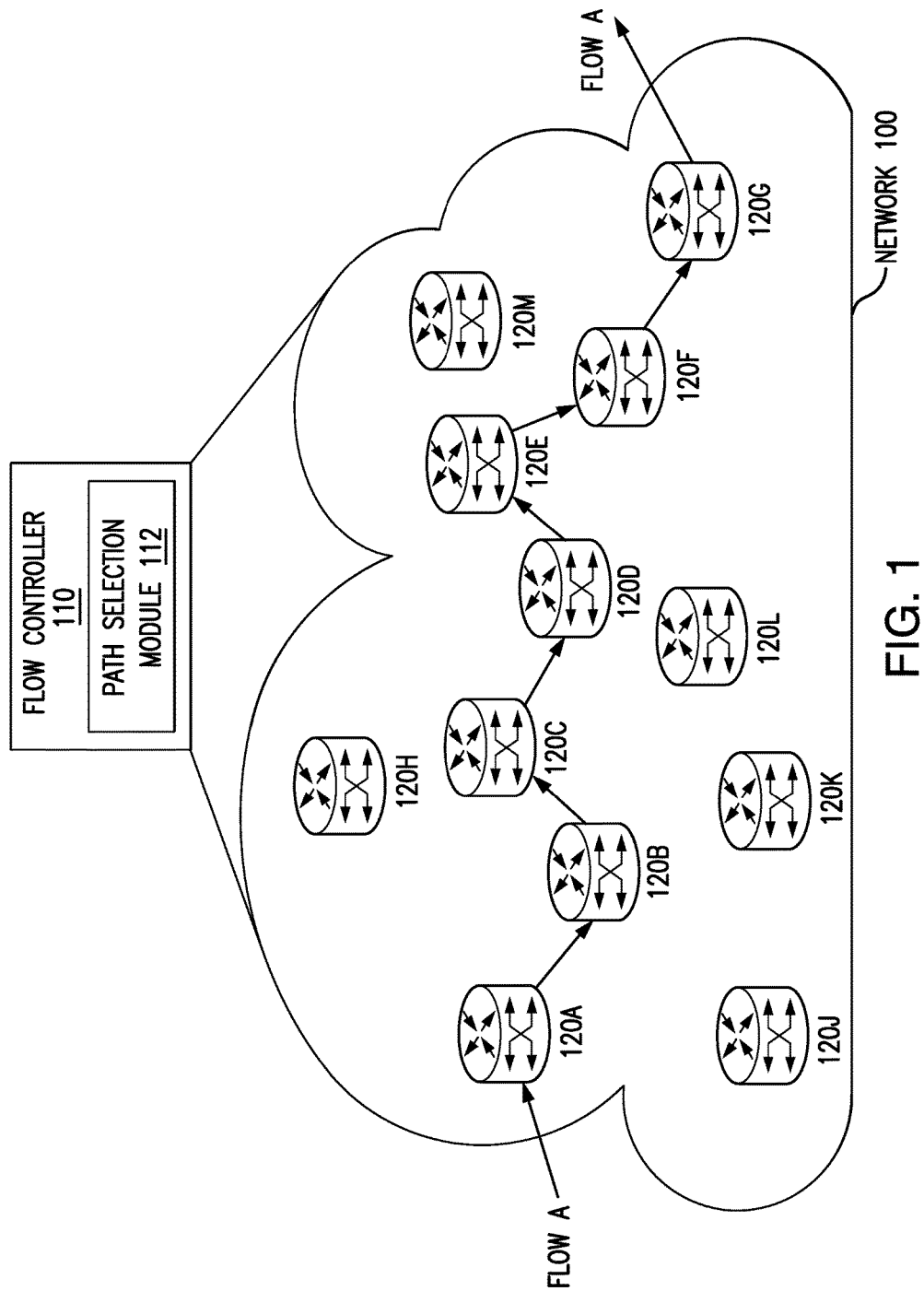
FIG. 1 illustrates an exemplary flow-based, split-architecture network.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

A network element can be a multifunctional network element that integrates both a control plane and a data plane (sometimes referred to as a forwarding plane or a media plane) into the same network element. In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

A multifunctional network element can include a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)).

Unlike a monolithic network architecture that requires complex network management functions to be distributed in the control planes of multifunctional network elements throughout the network, and require complex data and control planes integrated into the same multifunctional network element, a flow-based, split-architecture network allows the data planes of the network to be separated from the control planes. Data planes can be implemented as simple discrete flow switches distributed throughout the network, and the control planes with the network's intelligence are implemented in a flow controller that oversees the flow switches. By decoupling the control function from the data forwarding function, the split architecture eases the task of modifying the network control logic and provides a programmatic interface upon which developers can build a wide variety of new protocols and management applications. This allows the data and control planes to evolve and scale independently, while reducing the cost of the data plane network components.

FIG. 1 illustrates an exemplary flow-based, split-architecture network 100. A flow-based, split-architecture network will simply be referred to as a "split-architecture network." The split-architecture network 100 has a plurality of flow switches 120A-M that is controlled by a flow controller 110. The flow controller 110 and the flow switches 120A-M can communicate and exchange information using a communication protocol. In some embodiments, the communication protocols may be proprietary in nature, while in other embodiments, the communication protocols may conform to one of various industry standard communication protocols such as, OpenFlow protocol, for example. In the split-architecture network 100, the flow controller 110 collects information from the flow switches 120A-M, and a path selection module 112 in the flow controller 110 that automatically computes optimal flow path and distributes the appropriate forwarding decisions to the flow switches 120A-M. Each of the flow switches 120A-M has a forwarding table that is updated and maintained by the flow controller 110. The forwarding table in each flow switch has a set of flow entries that are each associated with a particular flow. Each flow entry includes a set of match fields that are used to identify packets belonging to the particular flow that is associated with the flow entry. Each flow entry also has a set of actions that the particular flow switch is to perform on packets that matches the flow entry. When an incoming packet matches a particular flow entry (i.e. the packet has header, port, or other information matching the match fields in one of the flow entries in the forwarding table), the packet is identified as belonging to the flow that is associated with the flow entry, and the associated set of actions are performed on the packet and all subsequent packets of the flow. The set of actions can include changing portions of the packet header information and forwarding out the packet on a particular port towards the next flow switch along the selected optimal flow path. Each flow entry also has a set of statistics associated with the particular flow such as various packet counters.

A flow switch in a split-architecture network can perform three different roles based on its location with respect to a flow in the split-architecture network—ingress flow switch, egress flow switch, and internal flow switch. A flow enters a split-architecture network through the ingress flow switch, passes through the split-architecture network domain through internal flow switches, and exits the domain through the egress flow switch. A "path" is a collection of links. A path is designated herein as a sequence of switches between an ingress flow switch and an egress flow switch. A single flow switch can serve multiple roles for different flows. For example, a single flow switch can be an ingress flow switch for one flow, an internal flow switch for a different flow, and/or an egress flow switch for another flow.

In one embodiment, each flow from an ingress to an egress switch is configured/programmed by a user (i.e., network administrator) via flow entries in forwarding tables. To facilitate the processing of packets that do not match any of the programmed flow entries, the forwarding table of each flow switch 120A-M has a default entry with a default action that is to either send a packet that does not match any programmed flow entries to the flow controller 110 or to drop that packet. The default entry is reached when the flow switch has searched through all the programmed flow entries in its forwarding table and determined that the packet does not match any of the programmed flow entries. In this embodiment if the default entry is reached, the packet is simply dropped.

The optimal flow path is made up of flow switches 120A through 120G in order. This new flow is to enter the split-architecture network 100 at ingress flow switch 120A and traverse through flow switches 120B-G. This new flow exits the split-architecture network 100 at flow switch 120G, and hence, flow switch 120G is the egress flow switch for FLOW A. When the flow controller 110 assigns this optimal flow path to FLOW A, the flow controller 110 configures each of the flow switches 120A-G to have a flow entry associated with FLOW A in their respective forwarding tables. As a result each forwarding table associated with the flow switches 120A-G has a flow entry that is associated with FLOW A. In this manner, when each of the flow switches 120A-G receives a packet belonging to FLOW A, the flow switch can look up the set of actions in the flow entry that is associated with FLOW A to correctly forward the packet along the optimal flow path selected and assigned to FLOW A by the flow controller 110.

Once the flow controller 110 has programmed the flow entries in the forwarding tables of the flow switches 120A-G for FLOW A, when a packet belonging to FLOW A enters the split-architecture network 100 at the ingress flow switch 120A, the ingress flow switch 120A performs a lookup of a set of match fields (e.g., header and port information) in the packet to determine if the match fields of the packet matches any of the programmed flow entries in the forwarding table of the ingress flow switch 120A. The ingress flow switch 120A determines that a matching entry is found because the flow controller 110 has previously programmed a flow entry for FLOW A in its forwarding table. The flow entry for FLOW A includes a set of actions that the ingress flow switch 120A should perform on the packet to correctly forward the packet along the optimal flow path for FLOW A. The ingress flow switch 120A then performs these actions and forwards the packet to flow switch 120B according to the set of actions in the flow entry for FLOW A in its forwarding table. When flow switch 120B receives this packet, flow switch 120B performs a lookup in its forwarding table and forwards the packet accordingly along the determined optimal flow path for FLOW A. This process repeats at each flow switch 120A-G along the optimal flow path for FLOW A.

In the split-architecture network 100, whenever a new flow enters the split-architecture network 100, there may be multiple distinct paths between the ingress flow switch 120A and the egress flow switch 120G, such as, but not limited to (120A-120H-120C-120D-120E-120M-120G), (120A-120J-120B-120K-120L-120D-120E-120M-120F-120G), (120A-120B-120C-120D-120E-120F-120G), etc. As the number of flow switches increases with growing networks, the number of potential flow paths in a network also increases. There are many considerations in selecting a path between any two switches (e.g., between the ingress flow switch 120A and the egress flow switch 120G). These considerations include, but are not limited to, connections between switches, connections between blades in the same chassis (if switches are implemented using blade-based switching architecture), the type of connection, the maximum and available bandwidth of the connection and user access rights to various flow paths. Of primary importance is the use of cross switch connections, as these may travel between states or even countries and are therefore expensive. Assuming that each cross-switch connection can support the same rate of traffic flow, in cases where two distinct paths use the same number of cross switch links (connections), there are often multi-path routes within a switch to make a connection. Thus, an appropriate selection of the best path can maximize efficiency of switch resources while minimizing costs in terms of switch hardware. Systems and methods exist that that can be used to solve the problem of finding shortest paths through networks, by applying a modification of Dijkstra's shortest path algorithm. However, these methods rely on cost of each path calculated as a single numeric value. Accordingly, an improved path selection method that takes into consideration multiple relevant criteria would lead to more efficient use of the network resources.

Figure 2:
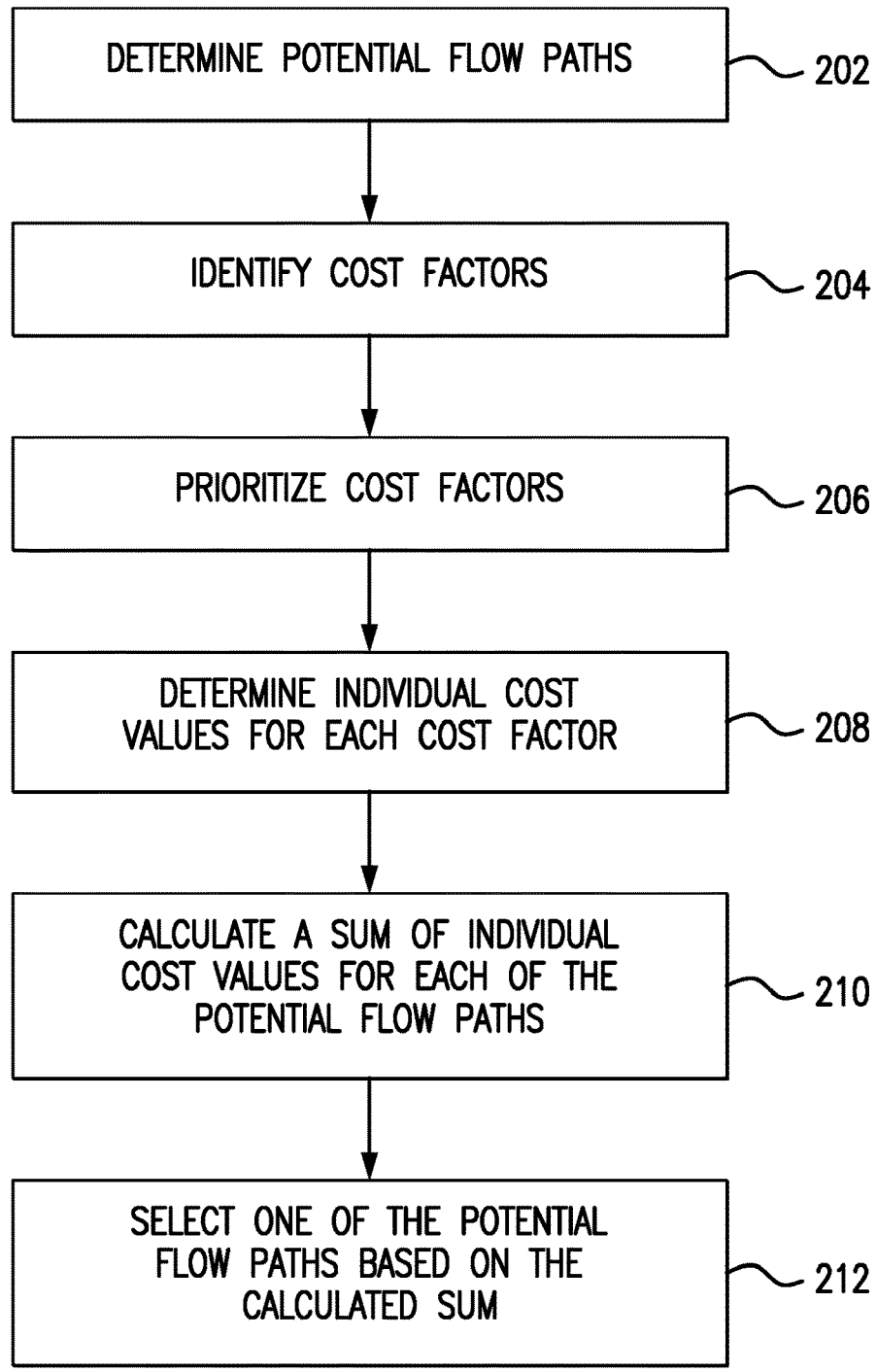
FIG. 2 is a flowchart of operational steps for selecting optimal path performed by the path selection module of FIG. 1, in accordance with an illustrative embodiment of the present invention.
Figure 4:
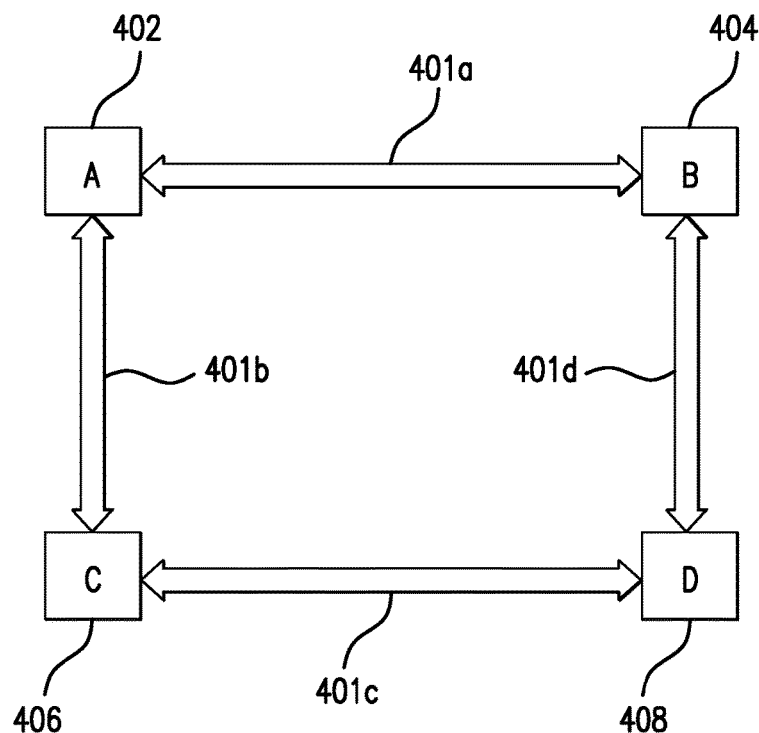
FIG. 4 is another exemplary graph illustrating calculation of cost values in accordance with an exemplary embodiment of the present invention.
Figure 5:
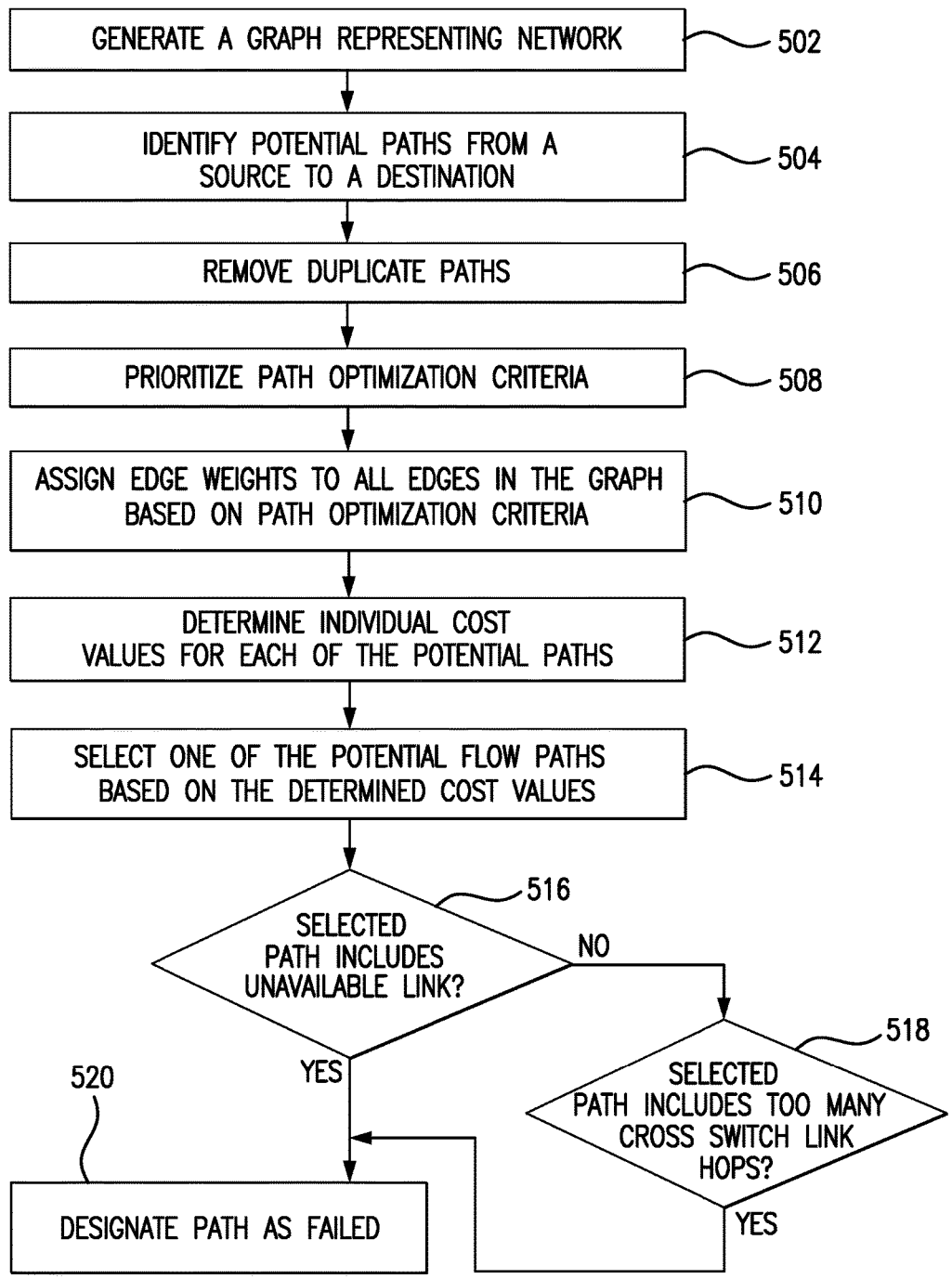
FIG. 5 is a flowchart of operational steps performed for selecting optimal path performed by the path selection module of FIG. 1, in accordance with another embodiment of the present invention.

FIGS. 2 and 5 are flowcharts of operational steps for selecting optimal path performed by the path selection module of FIG. 1, in accordance with exemplary embodiments of the present invention. Before turning to descriptions of FIGS. 2 and 5, it is noted that the flow diagrams shown therein are described, by way of example, with reference to components shown in FIGS. 1 and 3-4, although these operational steps may be carried out in any system and are not limited to the scenario shown in the aforementioned figures. Additionally, the flow diagrams in FIGS. 2 and 5 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

As noted above, systems and methods exist that that can be used to solve the problem of finding shortest paths through networks, by applying a modification of Dijkstra's shortest path algorithm, but these methods rely on cost of each path calculated as a single numeric value. In a split-architecture network, such as network 100 there are multiple relevant criteria that should be used to determine an optimal path. FIGS. 2 and 5 illustrate methods that apply multiple cost factors based on these multiple criteria for automated path selection.

Starting with FIG. 2, at 202, the path selection module 112 preferably determines all potential paths between ingress flow switch 120A and egress flow switch 120G using, for example, learned topology of the network 100. The topology can be learned through the exchange of link state advertisements conforming to OSPF protocol. The OSPF is an interior gateway routing protocol. OSPF (defined in RFC 2328) is a link-state protocol in which a router broadcasts its neighbors' link-state information to all the nodes in the routing domain. In some embodiments, the flow controller 110 maintains a link-state database which reflects the entire network topology.

According to embodiments of the present invention, relatively improved paths (e.g., optimized paths) may be selected by use of the multiple routing parameters that add additional data and/or constraints into the route selection process, for example, taking into account the load of the links in addition to the nominal bandwidth. The path selection, using the multi-tier routing dataset having multiple parameters associated with each link, may be improved relative to route selection using conventional routing tables with a single value associated with each link. Thus, at step 204, the path selection module 112 may identify all routing parameters/criteria. Optionally, the path selection module 112 may use a pre-configured routing policy that defines a subset of the different routing criteria. Using the same routing dataset, different routing paths may be selected by the flow controller 110 for data flows having different routing policies. Some examples of relevant cost factors include but are not limited to: a number of inter-switch links, nominal bandwidth of each link, available bandwidth of each link, etc.

In accordance with at least some embodiments of the present invention, the path selection module 112 may be adapted to prioritize as many cost factors as possible (step 206). In one embodiment, the path selection module 112 may refer to a priority table maintained by the flow controller 110 to prioritize which factors will be given higher weight when evaluating the cost of a particular path. As a non-limiting example, assume that the priority table indicates that three factors, namely $F_1$, $F_2$ and $F_3$ can be used by the path selection module 112 to evaluate the cost of a path. Furthermore, assume that the priority table indicates that $F_1$ is more important than $F_2$ and $F_2$ is more important than $F_3$, such that any path with a better $F_1$ is preferred regardless of $F_2$ and $F_3$ and any path with the same $F_1$ is preferred if it has a better $F_2$ regardless of $F_3$, and so forth. Thus, at step 206, the path selection module 112 may prioritize cost factors (i.e., $F_1$, $F_2$ and $F_3$) using the priority table based on predetermined criteria.

According to an embodiment of the present invention, multiple stratified cost factors (criteria) are applied. More specifically, at step 208, the path selection module 112 determines individual cost values for each cost factor by bounding each to a finite range and by multiplying each criterion by a factor such that the output range of each criterion is distinct. In one embodiment, each value of the identified plurality of cost factors is greater than or equal to 0 and less than 1. To produce a single cost value from three distinct factors (i.e., $F_1$, $F_2$ and $F_3$), the path selection module 112 stratifies these factors into individual cost values $C_1$, $C_2$ and $C_3$ such that the range of $C_1$ does not overlap the range of $C_2$ or $C_3$ and the range of $C_2$ does not overlap the range of $C_3$. In one embodiment, the identified cost factors are multiplied by a stratification factor to produce the individual cost values that fall into distinct non-overlapping ranges according to formulas (1), (2) and (3) below:

$$C_1 = 10 + 90*F1 \qquad (1),$$

$$C_2 = 1 + 9*F2 \qquad (2),$$

$$C_3 = F_3 \qquad (3)$$

By using the formulas (1), (2) and (3), the path selection module 112 generates individual cost values $C_1$, $C_2$ and $C_3$ in the following respective ranges: $10 \le C_1 < 100$, $1 \le C_2 < 10$ and $0 \le C_3 < 1$.

Next, at step 210, the path selection module 112 calculates the single cost value for each potential path. In one embodiment, determination of the single cost value C includes calculating a sum of the determined individual cost values using the following formula (4):

$$C = C_1 + C_2 + C_3 \qquad (4).$$

At step 212, based on the topology map and the enhanced multi-criteria link cost values determined at step 210, the path selection module 112 selects the optimum (least-cost) path from the plurality of paths identified at step 202 using, for example, Dijkstra's algorithm. This information is in turn used by the flow controller 110 to create a set of actions in each relevant switch's forwarding table that are used for forwarding of packets along the determined optimal flow path (i.e., the flow path for FLOW A shown in FIG. 1).

FIG. 5 is a flowchart of operational steps performed for selecting optimal path performed by the path selection module of FIG. 1, in accordance with another embodiment of the present invention. As noted above, in a split-architecture network, such as network 100 there are multiple relevant criteria that should be used to determine an optimal path. FIG. 5 illustrates another method that applies multiple cost factors based on these multiple criteria for automated path selection. In this embodiment, the path selection module 112 may also use a pre-configured routing policy that defines a set of rules related to the different routing criteria. In some embodiments, different routing paths may be selected by the flow controller 110 for data flows having different routing policies.

In one exemplary embodiment, routing policies may contain rules that specify a predefined maximum number of data transmission hops over cross switch links for a potential optimal path. For example, the rules may specify the maximum number of data transmission hops over cross switch links to be equal to 7. In this exemplary embodiment, the routing policies may additionally contain the following rules: an optimal path cannot cross the same switch twice; and an optimal path may not travel from one backplane to another (if switches are implemented using blade server architecture). The blade-based switching architecture may include one or more multi-switch chassis. As used herein, the term "multi-switch chassis" refers to a switch architecture that includes a chassis, backplane, and various other circuitry (e.g., power supply, a centralized chassis controller, or the like) for enabling use of a plurality of switches. More specifically, the routing rules may specify that if a potential optimal path for routing data flow exits a switch via a trunk or a cross switch link, it may not re-enter the same switch again. With respect to backplanes, a backplane is typically made up of plural layers of print circuit boards and connectors and usually comprises a plurality of slots of different functions. Each single board is inserted into a slot for providing services (i.e., switching services). The rules may specify that to make a connection, for example, from slot 1 to slot 3 a backplane connection 1→3 may be used, but not 1→2 then 2→3.

In yet another embodiment, to prevent data duplication, rules may require only one given potential optimal path to be connected from a source port to a given blade. In other words, the path selection module 112 will only make one link path per switch to which it connects. In yet another embodiment, the routing policies may specify connection failure conditions. For example, if the shortest possible path to a destination port traverses an unusable backplane, the potential connection via this shortest possible path can be considered a failure. As used herein, the term "unusable link" refers to a communication link that is down or lacks sufficient bandwidth to carry data received at an ingress switch/port. In one embodiment, if this rare scenario occurs, the path selection module 112 may then notify a user of a detected failure rather than calculate an alternative path which may become computationally expensive.

Figure 3:
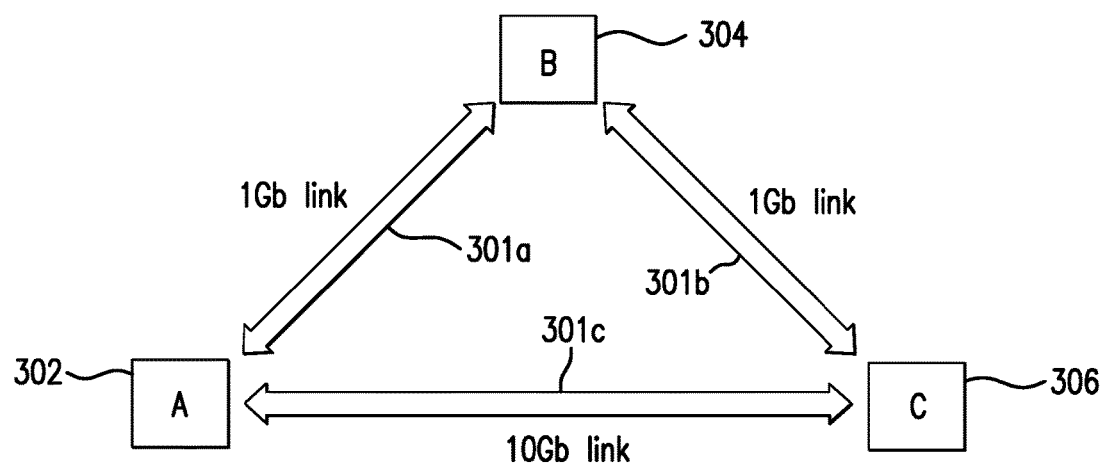
FIG. 3 is an exemplary graph illustrating calculation of cost values in accordance with an exemplary embodiment of the present invention.

Referring now to FIG. 5, as part of a startup sequence, at step 502, the path selection module 112 may generate a directed graph representing network 100 based on the learned or configured topology of the network, as described above. In one embodiment, the generated graph (exemplary simplified graphs are shown in FIGS. 3 and 4) may include a plurality of vertices and a plurality of edges connecting the plurality of vertices. The plurality of vertices represents a plurality of network elements (i.e., switches). The plurality of edges represents a plurality of network links interconnecting the plurality of network nodes. In one embodiment, the plurality of edges may include one or more backplanes of one or more multi-switch chassis, regardless of state, including all backplanes active for the source port on a source node, regardless of domain or link state. In an embodiment, the plurality of edges may further represent all usable physical cross-switch links and trunks in the network's 100 domain, including all cross-switch links and trunks active for the source port that will send network traffic, regardless of domain or link state.

At step 504, the path selection module 112 preferably determines all potential paths between the ingress flow switch 120A and egress flow switch 120G using, for example, the directed graph generated at step 502.

Next, at step 506, the path selection module 112 may optionally eliminate duplicate potential flow paths in the generated directed graph having vertices (or nodes) connected by edges or links. In other words, the path selection module 112 may perform an operation that resolves duplicate flow paths in the generated graph, such that if an active link leads to a vertex and if one or more additional active links to the same vertex exist, the path selection module 112 disables all of these additional links to that vertex for the selected path. It should be noted that a candidate path for a specific flow is a duplicate path if it shares a particular vertex with another path and if one of another path's edges to the particular vertex represents an active link assigned to carry specific flow's traffic from the same source port.

In accordance with at least some embodiments of the present invention, the path selection module 112 may be adapted to prioritize as many path optimization criteria (cost factors) as possible (step 508). In one embodiment, the path selection module 112 may refer to a priority table maintained by the flow controller 110 to prioritize which factors will be given higher weight when evaluating the cost of a particular path. As a non-limiting example, assume that the priority table includes a set of ranked criteria.

Embodiments of the present invention provide a solution that employs ranked categories of candidate paths for optimal path determination. In particular, the data communication links (or graph edges) are assigned by the path selection module 112 to one of a plurality of path categories based on one or more attributes of the links. Various attributes of the links may include, but are not limited to link types (i.e., cross-switch links, backplane links, etc.), bandwidth mode of a link (i.e., guaranteed bandwidth mode, aggregated bandwidth mode, etc.), and the like. The categories are then ranked for each of one or more optimization criteria. Each criterion can use a unique set of the attributes to rank the categories. As used herein, unless otherwise noted, the term "set" means one or more (i.e., at least one) and the phrase "any solution" means any now known or later developed solution.

For example, a first (top ranked) category may include all potential paths having fewest jumps over cross-switch links or trunks. A second category may include all potential paths having highest number of links operating in guaranteed bandwidth mode, while a third category may include all potential paths having links operating in aggregated bandwidth mode. It should be noted that in this example, the path selection module 112 may generally prefer a guaranteed bandwidth link over an aggregated bandwidth link, unless the available bandwidth of the available guaranteed bandwidth links is insufficient for a particular data flow. Furthermore, the priority table and/or routing policies may specify that between the available guaranteed bandwidth links, the path selection module 112 for each link should estimate bandwidth remaining after the proposed connection is made and pick the one with the least bandwidth remaining, so as to preserve the largest possible links for connecting future flows having larger bandwidths; and the priority table and/or routing policies may specify that between the available aggregated bandwidth links, the path selection module 112 for each link should estimate a bandwidth value remaining after the proposed connection is made and pick the one with the highest percentage of bandwidth connection, so as to minimally overload aggregation cross links. Thus, at step 508, the path selection module 112 may prioritize cost factors using the priority table based on the predetermined path optimization criteria.

According to an embodiment of the present invention, at 510, the path selection module 112 preferably generates and assigns edge weights to all edges in the generated directed graph based on the path optimization criteria described above. In one embodiment, the path selection module 112 may generate edge weights (W) using the following formula (5):

$$W=W_X+W_B+W_A+W_G \qquad (5),$$

where:

$W_X=0$ {if the corresponding link is not a cross-switch link or trunk} or $V^4$ {if the corresponding link is a cross-switch link or trunk}+$2*V^2$ {if the corresponding cross-switch link is unusable and not active};

$W_B=0$ {if the corresponding link is not a backplane link} or $V^3$ {if the corresponding link is crossing a backplane}+$2*V^2$ {if the corresponding backplane link is unusable and not active};

$W_A=0$ {if the corresponding link is already active or if the corresponding link is not a link having an aggregated bandwidth mode} or V+ estimated value of bandwidth usage of the corresponding link after the proposed connection/(LB*MS) {if the corresponding link is a link having an aggregated bandwidth mode};

$W_G=0$ {if the corresponding link is already active or if the corresponding link is not a link having a guaranteed bandwidth mode} or (1+ estimated value of unused bandwidth usage of the corresponding link after the proposed connection)/(2+MB) {if the corresponding link is a link having a guaranteed bandwidth mode}, where V represents the total number of vertices in the graph;

MB represents the maximum bandwidth value of any link being evaluated;

LB represents the maximum bandwidth value of the corresponding link (when empty);

MS represents the maximum subscription ratio of any aggregated link being evaluated, after the proposed connection is made. The value of MS is bound to be greater than or equal to one.

In this embodiment, by using the formula (5), the path selection module 112 essentially ranks each category of one or more optimization criteria corresponding to individual weight values $W_X$, $W_B$, $W_A$ and $W_G$. Advantageously, the path selection module 112 employs variable V to stratify each optimization criteria category into individual weight values $W_X$, $W_B$, $W_A$ and $W_G$ such that the range of $W_G$ does not overlap the ranges of $W_X$, $W_B$, and $W_A$; the range of $W_A$ does not overlap the ranges of $W_X$ and $W_B$; and the range of $W_B$ does not overlap the range of $W_X$. In other words, in the formula (5) above no lower-importance criterion can have a value that overlaps the range of a higher importance criterion.

In one embodiment, the path selection module 112 bounds the fractional parts of $W_A$ and $W_G$ to values greater than 0 and less than 1 in order to ensure that their sums cannot overlap the least possible value of the next higher ranked optimization criterion category. For instance, in the above discussion, it will be appreciated by those of skill in the art that if the total number of vertices in the generated graph is equal to 10, the highest possible sum of $W_G$ values should be less than 10, while the lowest possible sum of $W_A$ values should be greater than 10. Furthermore, 1 is added to the numerator and denominator of $W_G$, because $W_G$ value should not be equal to zero for a non-active link. If $W_G$ value for a non-active link evaluates to zero, it could have the same weight as an inactive fully packed link having guaranteed bandwidth, which is considered to be against the routing policies described above. If a backplane of any blade server is unusable, the addend $2*V^2$ is used above for calculating $W_X$ and $W_B$ in order to make the path going through this blade server one of the highest weighted paths regardless of the values of $W_A$ and $W_G$. This operation guarantees that a path containing an unavailable backplane will be the shortest only if there are no other available paths of equivalent or shorter length. In other words, if the shortest path requires an unavailable backplane, no other path will be selected. Also, if any particular link is already active, both $W_A$ and $W_G$ values corresponding to that link are equal to zero, while if that link is inactive the sum of $W_A$ and $W_G$ is guaranteed to be non-zero based on the formulas above. This operation makes an active link preferable to other links as long as it is not part of a path with number of hops exceeding alternate path's number of hops.

According to an embodiment of the present invention, once all edge weights are assigned, at 512, the path selection module 112 preferably determines individual cost values for each of the potential paths using the formula (5) above. FIG. 3 is an exemplary graph illustrating calculation of cost values in accordance with an exemplary embodiment of the present invention. The simplified graphical representation of a network in FIG. 3 comprises various vertices representing the switches 302-306 and various edges 301a-301c representing the connectivity links between the switches 302-306. In FIG. 3, a first switch 302, also denoted as node A, comprises an ingress switch containing a source (ingress) port with a transmission speed of 1 Gigabit (Gb) per second, for example. A third switch 306, also denoted as node C, contains a destination (egress) port in this case, while a second switch 304, also denoted as node B, comprises an internal flow switch. Further assume that in this example first and second links, 301a and 301b, respectively, are fully available and operating at 1 Gigabit (Gb) per second in guaranteed bandwidth mode, while a third link 301c is also fully available and operating at 10 Gb per second in guaranteed bandwidth mode. The path selection module 112 determines individual cost values for each of the links in the graph using formula (5):

$$W(A-B)=(3^4)+(0)+(0)+((1+0)/(2+10))=81.083;$$

$$W(B-C)=(3^4)+(0)+(0)+((1+0)/(2+10))=81.083;$$

$$W(A-C)=(3^4)+(0)+(0)+((1+9)/(2+10))=81.83;$$

In the above calculations: V=3 because there are 3 vertices in the exemplary graph, values of $W_B$ and $W_A$ are equal to zero because all paths are cross-switch links operating in guaranteed bandwidth mode. There are two candidate paths between the ingress switch 302 and the egress switch 306: A→C and A→B→C, thus the path selection module 112 determines individual cost values for each of the paths using determined cost values for each link as follows:

$$W(A-C)=81.83;$$

$$W(A-B-C)=W(A-B)+W(B-C)=81.083+81.083=162.166.$$

FIG. 4 is another exemplary graph illustrating calculation of cost values in accordance with an exemplary embodiment of the present invention. In FIG. 4, a first switch 402, also denoted as node A, comprises an ingress switch containing an ingress port with a transmission speed of 1 Gigabit (Gb) per second, for example. A fourth switch 408, also denoted as node D, contains an egress port in this case, and the second 404 and third 406 switches, denoted as nodes B and C, respectively, comprise internal flow switches. Further, assume that in this example the first 402 and second 404 switches are already connected by an active first link 401a having 9 Gb of its 10 Gb bandwidth being used in guaranteed bandwidth mode. On the other hand, a second 401b, third 401c and fourth 401d links are inactive links having 9 Gb of their 10 Gb bandwidth being used in guaranteed bandwidth mode. In this case, the path selection module 112 determines individual cost values for each link using the formula (5) as follows:

$$W(A-B)=(4^4)+(0)+(0)+(0)=256 \text{ [in this case } W_G \text{ is 0 because the first link 401 is already active]}$$

$$W(B-D)=(4^4)+(0)+(0)+((1+0)/(2+10))=256.083;$$

$$W(A-C)=(4^4)+(0)+(0)+((1+9)/(2+10))=256.083;$$

$$W(C-D)=(4^4)+(0)+(0)+((1+9)/(2+10))=256.083.$$

In the above calculations: V=4 because there are 4 vertices in the exemplary graph, values of $W_B$ and $W_A$ are equal to zero because all paths are cross-switch links operating in guaranteed bandwidth mode. There are two candidate paths between the ingress switch 402 and egress switch 404: A→B→D and A→C→D, thus the path selection module 112 determines individual cost values for each of the paths using the determined cost values for each link as follows:

$$W(A-B-D)=W(A-B)+W(B-D)=256+256.083=512.083;$$

$$W(A-C-D)=W(A-C)+W(C-D)=256.083+256.083=512.166.$$

Referring back to FIG. 5 now, once all individual cost values for each of the potential paths are determined, at 514, the path selection module 112 selects one of the potential flow paths based on the cost values determined in step 512 as illustrated above. In one embodiment, the path selection module 112 selects the shortest path between the source node (ingress switch) and destination node (egress switch) using the Dijkstra algorithm. In some embodiments multiple alternative paths may comprise equal cost paths between the source and destination. Continuing with the examples illustrated above in conjunction with FIGS. 3 and 4, in the first example, the path selection module 112 selects between W (A-C)=81.83 and W (A-B-C)=162.166. Since the cost of the path W (A-C) is the smallest, this path is selected by the path selection module 112 as an optimal path. In FIG. 3, the optimal path is represented by the third link 301c. It can be seen in FIG. 3, that this path is chosen because it has fewer hops which is taken into consideration by corresponding weight values in calculations above. In the second example, the path selection module 112 also selects between two potential paths having cost values W (A-B-D)=512.083 and W (A-C-D)=512.166. Since the cost of the path W (A-B-D) is smallest, this path is selected by the path selection module 112 as an optimal path. In FIG. 4, the optimal path includes the first 401a and fourth 401d links. Formula (5) as applied to the graph depicted in FIG. 4 illustrates that in accordance with an embodiment of the present invention a path having an active link will have a preference in selection of optimal path to conform to the pre-configured routing policy described above.

According to an embodiment of the present invention, once the optimal path is selected, at 516, the path selection module 112 determines whether the selected path includes any unavailable links. In response to determining that all links in the selected optimal path are available (decision block 516, "No" branch), the path selection module 112 determines next (step 518) whether a number of cross switch link hops exceeds a predefined threshold (e.g., 7 hops). If the selected path includes unavailable links (decision block 516, "Yes" branch) or if the selected path exceeds predefined threshold of cross-switch hops (decision block 518, "Yes" branch), at step 520, the path selection module 112 designates the proposed connection as failed and optionally reports the problem to a user. In one embodiment this designation means that the path selection module 112 may assign a maximum weight value to a corresponding path. This designation indicates, if that path is chosen, that there is no other path available and the path selection module 112 can inform the user that a potential path exists, but it can't be used because it is unavailable (meaning it can be fixed), rather than just informing the user that there's no path at all.

In summary, there are many considerations in selecting a path between any two switches. An optimal selection of the best path can maximize efficiency of switch resources while minimizing costs in terms of switch hardware. Various embodiments of the present invention provide an improved path selection method that takes into consideration multiple relevant criteria that would lead to more efficient use of the network resources.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
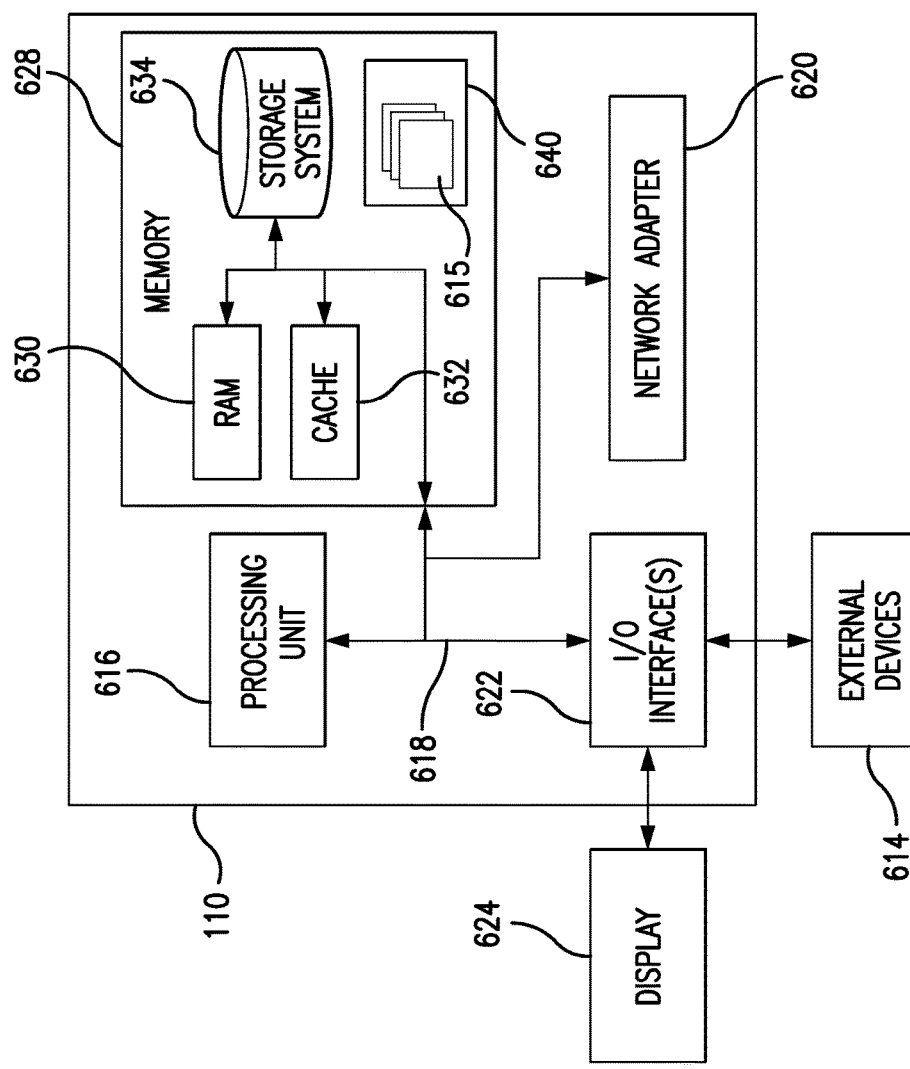
FIG. 6 illustrates internal and external components of a flow controller device in accordance with illustrative embodiments of the present invention.

Embodiments of the network monitoring system may be implemented or executed by one or more computer systems. One such computer system, the flow controller 110 is illustrated in FIG. 6. In various embodiments, flow controller 110 may be a server, a distributed computer system, a workstation, a network computer, a desktop computer, a laptop, or the like.

Flow controller 110 is only one example of a suitable system and is not intended to suggest any limitation as to the scope of use or functionality of embodiments of the invention described herein. Regardless, flow controller 110 is capable of being implemented and/or performing any of the functionality set forth hereinabove.

Flow controller 110 is operational with numerous other general purpose or special purpose computing system environments or configurations. Examples of well-known computing systems, environments, and/or configurations that may be suitable for use with the flow controller 110 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The components of the flow controller 110 may be described in the general context of computer system-executable instructions, such as program modules, being executed by a computer system. Generally, program modules may include routines, programs, objects, components, logic, data structures, and so on that perform particular tasks or implement particular abstract data types. Flow controller 110 may be practiced in distributed data processing environments where tasks are performed by processing devices that are linked through a communications network. In a distributed data processing environment, program modules may be located in both local and remote computer system storage media including memory storage devices.

The flow controller system 110 is shown in FIG. 6 in the form of a general-purpose computing device. The components of flow controller 110 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Flow controller 110 typically includes a variety of computer system readable media. Such media may be any available media that is accessible by flow controller 110, and it includes both volatile and non-volatile media, removable and non-removable media.

System memory 628 can include computer system readable media in the form of volatile memory, such as random access memory (RAM) 630 and/or cache memory 632. Flow controller 110 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 615 (such as path selection module 112) may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

Flow controller 110 may also communicate with one or more external devices such as a keyboard, a pointing device, a display, etc.; one or more devices that enable a user to interact with flow controller 110; and/or any devices (e.g., network card, modem, etc.) that enable flow controller 110 to communicate with one or more other computing devices. Such communication can occur via Input/Output (I/O) interfaces 622. Still yet, flow controller 110 can communicate with one or more networks such as a local area network (LAN), a general wide area network (WAN), and/or a public network (e.g., the Internet) via network adapter 620. As depicted, network adapter 620 communicates with the other components of flow controller 110 via bus 618. It should be understood that although not shown, other hardware and/or software components could be used in conjunction with flow controller 110. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method in a flow controller for automatically selecting an optimal one of a plurality of paths between two ports, the method comprising:

identifying, in the flow controller, a plurality of potential paths from a source port to a destination port through a graph representing a network, each of the potential paths including a plurality of vertices and a plurality of edges connecting the plurality of vertices, the plurality of vertices representing a plurality of network nodes and the plurality of edges representing a plurality of network links interconnecting the plurality of network nodes;

assigning edge weights to edges of the plurality of potential paths based on predefined path optimization criteria;

determining, in the flow controller, a cost value for each of the plurality of potential paths based on the assigned edge weights; and selecting, in the flow controller, one of the plurality of potential flow paths from the source port to the destination port based upon the determined cost value wherein the plurality of network links comprises at least one of cross-switch links and/or backplane links operating either in guaranteed bandwidth mode or aggregated bandwidth mode, and wherein the predefined path optimization criteria includes a number of data transmission hops over a cross-switch link included in a potential path, a number of data transmission hops over a back plane link, bandwidth of an aggregated link included in a potential path and bandwidth of a guaranteed link included in a potential path.

2. The method as recited in claim 1, further comprising, subsequently to identifying the plurality of potential paths, removing duplicate paths from the plurality of potential paths, wherein a potential path is a duplicate path if it shares a particular vertex with another path and if one of another path's edges to the particular vertex represents an active link assigned to carry traffic from the same source port.

3. The method as recited in claim 1, further comprising prioritizing the predefined path optimization criteria based on predefined importance of each path optimization criterion.

4. The method as recited in claim 1, wherein assigning edge weights to edges further comprises:

assigning a plurality of weight values to each edge of the plurality of potential paths, wherein each of the plurality of weights corresponds to one of the predefined path optimization criteria; and determining a single weight value for each edge of the plurality of potential flow paths based on the determined plurality of weights.

5. The method as recited in claim 1, wherein assigning a plurality of weight values further comprises stratifying the plurality of weight values so that each of the plurality of weight values falls into a distinct non-overlapping range of values.

6. The method as recited in claim 1, further comprising designating a connection between the source port and the destination port as failed if the selected one of the plurality of potential flow paths includes an edge representing an unavailable link or if the selected one of the plurality of potential flow paths includes more than a predefined maximum number of data transmission hops over a cross switch link.

7. The method as recited in claim 4, wherein a weight value corresponding to bandwidth of an aggregated link is assigned so that an aggregated link having highest percentage of bandwidth remaining after a potential connection between the source port and the destination port is made will have a lowest weight value.

8. The method as recited in claim 4, wherein a weight value corresponding to bandwidth of a guaranteed link is assigned so that a guaranteed link having least bandwidth remaining after a potential connection between the source port and the destination port is made will have a lowest weight value.

9. A method in a flow controller for automatically selecting an optimal one of a plurality of paths between two ports, the method comprising:

identifying, in the flow controller, a plurality of potential paths from a source port to a destination port through a graph representing a network, each of the potential paths including a plurality of vertices and a plurality of edges connecting the plurality of vertices, the plurality of vertices representing a plurality of network nodes and the plurality of edges representing a plurality of network links interconnecting the plurality of network nodes;

assigning edge weights to edges of the plurality of potential paths based on predefined path optimization criteria wherein assigning edge weights to edges includes assigning a plurality of weight values to each edge of the plurality of potential paths, wherein each of the plurality of weights corresponds to one of the predefined path optimization criteria and determining a single weight value for each edge of the plurality of potential flow paths based on the determined plurality of weights wherein a weight value corresponding to bandwidth of an aggregated link is assigned so that an aggregated link having highest percentage of bandwidth remaining after a potential connection between the source port and the destination port is made will have a lowest weight value;

determining, in the flow controller, a cost value for each of the plurality of potential paths based on the assigned edge weights and selecting, in the flow controller, one of the plurality of potential flow paths from the source port to the destination port based upon the determined cost value.

10. The method as recited in claim 9, further comprising, subsequently to identifying the plurality of potential paths, removing duplicate paths from the plurality of potential paths, wherein a potential path is a duplicate path if it shares a particular vertex with another path and if one of another path's edges to the particular vertex represents an active link assigned to carry traffic from the same source port.

11. The method as recited in claim 9, wherein the plurality of network links comprises at least one of cross-switch links and/or backplane links operating either in guaranteed bandwidth mode or aggregated bandwidth mode, and wherein the predefined path optimization criteria includes a number of data transmission hops over a cross-switch link included in a potential path, a number of data transmission hops over a back plane link, bandwidth of an aggregated link included in a potential path and bandwidth of a guaranteed link included in a potential path.

12. The method as recited in claim 11, further comprising prioritizing the predefined path optimization criteria based on predefined importance of each path optimization criterion.

13. The method as recited in claim 9, wherein assigning a plurality of weight values further comprises stratifying the plurality of weight values so that each of the plurality of weight values falls into a distinct non-overlapping range of values.

14. The method as recited in claim 11, further comprising designating a connection between the source port and the destination port as failed if the selected one of the plurality of potential flow paths includes an edge representing an unavailable link or if the selected one of the plurality of potential flow paths includes more than a predefined maximum number of data transmission hops over a cross switch link.

15. The method as recited in claim 9, wherein a weight value corresponding to bandwidth of a guaranteed link is assigned so that a guaranteed link having least bandwidth remaining after a potential connection between the source port and the destination port is made will have a lowest weight value.

16. A method in a flow controller for automatically selecting an optimal one of a plurality of paths between two ports, the method comprising:

identifying, in the flow controller, a plurality of potential paths from a source port to a destination port through a graph representing a network, each of the potential paths including a plurality of vertices and a plurality of edges connecting the plurality of vertices, the plurality of vertices representing a plurality of network nodes and the plurality of edges representing a plurality of network links interconnecting the plurality of network nodes;

assigning edge weights to edges of the plurality of potential paths based on predefined path optimization criteria wherein assigning edge weights to edges includes assigning a plurality of weight values to each edge of the plurality of potential paths, wherein each of the plurality of weights corresponds to one of the predefined path optimization criteria and wherein a weight value corresponding to bandwidth of a guaranteed link is assigned so that a guaranteed link having least bandwidth remaining after a potential connection between the source port and the destination port is made will have a lowest weight value; and determining a single weight value for each edge of the plurality of potential flow paths based on the determined plurality of weights;

determining, in the flow controller, a cost value for each of the plurality of potential paths based on the assigned edge weights; and selecting, in the flow controller, one of the plurality of potential flow paths from the source port to the destination port based upon the determined cost value.

17. The method as recited in claim 16, further comprising, subsequently to identifying the plurality of potential paths, removing duplicate paths from the plurality of potential paths, wherein a potential path is a duplicate path if it shares a particular vertex with another path and if one of another path's edges to the particular vertex represents an active link assigned to carry traffic from the same source port.

18. The method as recited in claim 16, wherein the plurality of network links comprises at least one of cross-switch links and/or backplane links operating either in guaranteed bandwidth mode or aggregated bandwidth mode, and wherein the predefined path optimization criteria includes a number of data transmission hops over a cross-switch link included in a potential path, a number of data transmission hops over a back plane link, bandwidth of an aggregated link included in a potential path and bandwidth of a guaranteed link included in a potential path.

19. The method as recited in claim 18, further comprising prioritizing the predefined path optimization criteria based on predefined importance of each path optimization criterion.

20. The method as recited in claim 16, wherein assigning a plurality of weight values further comprises stratifying the plurality of weight values so that each of the plurality of weight values falls into a distinct non-overlapping range of values.

* * * * *